(12) United States Patent
Kuroiwa et al.

(10) Patent No.: US 7,378,152 B2
(45) Date of Patent: May 27, 2008

(54) ELECTROCONDUCTIVE ZINC OXIDE POWDER AND METHOD FOR PRODUCTION THEREOF, AND ELECTROCONDUCITVE COMPOSITION

(75) Inventors: Nobuyuki Kuroiwa, Toki (JP); Kazuhiro Tsuji, Toki (JP); Akira Senjyuu, Toki (JP)

(73) Assignees: CF High Tech Co., Ltd., Gifu (JP); Hakusui Tech Co., Ltd., Osaka (JP); Kyushu Hakusui Co., Ltd., Fukuoka (JP)

( * ) Notice: Subject to any disclaimer, the term of this patent is extended or adjusted under 35 U.S.C. 154(b) by 223 days.

(21) Appl. No.: 10/540,751

(22) PCT Filed: Oct. 17, 2003

(86) PCT No.: PCT/JP03/13283

§ 371 (c)(1),
(2), (4) Date: Jun. 24, 2005

(87) PCT Pub. No.: WO2004/058645

PCT Pub. Date: Jul. 15, 2004

(65) Prior Publication Data

US 2006/0110591 A1    May 25, 2006

(30) Foreign Application Priority Data

Dec. 25, 2002 (JP) ............................ 2002-374123
May 1, 2003 (JP) ............................ 2003-126529

(51) Int. Cl.
*B32B 5/16* (2006.01)
(52) U.S. Cl. ................. 428/403; 428/404; 428/405; 428/406; 428/407
(58) Field of Classification Search ............... 428/403, 428/404, 405, 406, 407
See application file for complete search history.

(56) References Cited

U.S. PATENT DOCUMENTS 5,132,104 A * 7/1992 Yamamoto et al. ...... 423/420.2
5,672,427 A   9/1997 Hagiwara et al.

FOREIGN PATENT DOCUMENTS

| CN | 1099779 | 3/1995 |
| JP | 58-161923 | 9/1983 |
| JP | 62-275182 | 11/1987 |
| JP | 10-236822 | 9/1998 |
| JP | 11-279525 | 10/1999 |
| JP | 2002-201024 | 7/2002 |
| JP | 2002-201382 | 7/2002 |
| WO | 02/42382 | 5/2002 |

OTHER PUBLICATIONS

"Zinc Oxide, Active Zinc Oxide and Their Reduced Amount Application in Rubber", pp. 24-28, 1997.

* cited by examiner

*Primary Examiner*—Leszek Kiliman
(74) *Attorney, Agent, or Firm*—Wenderoth, Lind & Ponack, L.L.P.

(57) ABSTRACT

A novel electroconductive zinc oxide powder which comprises zinc oxide and, being present as a solid solution formed with the zinc oxide, 0.01 to 10 mass % relative to the zinc oxide of at least one element selected from the group consisting of IIIB Group elements, IVB Group elements and Fe, has an average primary particle diameter of 0.03 μm or less as calculated from its specific surface area, a bulk density of 0.20 g/ml or less and a volume resistivity of $10^{10}$ Ω·cm or less; and a method useful for producing the electroconductive zinc oxide powder. The zinc oxide powder exhibits distinguished dispersibility when incorporated into a rubber, a resin or the like as an electroconductivity imparting agent, and thus can provide a material having a reduced electric resistance.

7 Claims, 1 Drawing Sheet

ELECTROCONDUCTIVE ZINC OXIDE POWDER AND METHOD FOR PRODUCTION THEREOF, AND ELECTROCONDUCITVE COMPOSITION

TECHNICAL FIELD

The present invention relates to an electroconductive zinc oxide powder having excellent dispersibility in a base material such as rubber and resin, and a process for the production thereof. More specifically, the invention relates to an electroconductive zinc oxide powder which has distinguished dispersibility when the powder is incorporated as an electroconductivity imparting agent into rubber, resin or the like and which gives a material low in electric resistance value; a process for the production thereof; and further an electroconductive composition to which electroconductivity is imparted by the incorporation of the electroconductive zinc oxide powder.

BACKGROUND ART

Electroconductive zinc oxide is widely made practicable as an additive for imparting electroconductivity to paint, rubber, resin or the like. In the field of paint out of these, the paint workability thereof generally lowers when the viscosity of the paint becomes high; therefore, powder having a relatively large particle size is used in many cases so as not to make the paint viscosity high. On the other hand, in the field of rubber, resin or the like, the viscosity of the composition thereof is hardly worth consideration; therefore, electroconductive zinc oxide powder having a relatively small particle size is used.

And now, several processes have already been suggested as the process for producing an electroconductive zinc oxide powder. For example, JP-A-1-126228 discloses a process for stirring three components of zinc oxide, a water-soluble or water-dispersible aluminum compound, and ammonium carbonate or the like in an aqueous dispersion system in the presence of inorganic fine powder, filtrating and dehydrating the resultant, and then heating the dehydrated substance at a temperature of about 600° C. or lower in a non-oxidizing atmosphere, thereby producing an electroconductive zinc oxide fine powder which has an average particle size of approximately 0.1 µm and is excellent in transparency.

However, about conventional electroconductive zinc oxide powders, examples of which include one based on the above-mentioned process, the average primary particle size thereof is restricted to approximately 0.1 µm even if the particle size is made small. According to the particle size at such a level, a sufficient electroconductivity is not easily obtained by the addition of the electroconductive zinc oxide powder alone for the following reason: even if the powder is incorporated into a base material such as rubber or resin and uniformly dispersed therein, the zinc oxide particles are not brought into close contact with each other in the powder-incorporated composition.

If the particle size of electroconductive zinc oxide powder can be made into the form of superfine particles, which has a particle size that is one or more figures smaller than the present particle sizes, contact points between the particles can be increased by dispersing the superfine particles uniformly into a base material such as rubber or resin. As a result, a rubber composition or resin composition having a low resistance value would be obtained.

As another example of electroconductive zinc oxide in such a fine particle form, JP-A-10-236822 discloses a process of heating and aging a liquid mixture of a carboxylic acid zinc salt and an alcohol to produce a zinc oxide precursor, mixing this precursor with a metal hydroxide or a compound which is reactive with water to produce a metal hydroxide, distilling off the alcohol, and then firing the resultant. It is stated that this process makes it possible to yield a zinc oxide fine powder having an average particle size of about 0.001 to 1 µm.

JP-A-7-69631 discloses a process of adding a hexamethylenetetramine solution or a urea solution to a liquid mixture of a zinc salt and an aluminum salt; hydrolyzing the resultant at a pH of 5.5 to 7.5 to produce a flaky basic zinc-based coprecipitate; adding to the flaky coprecipitate a water-soluble compound of at least one element selected from the group consisting of antimony, indium, tin, zirconium and titanium to coat the surface of the flaky zinc coprecipitate; and then firing the resultant. It is stated that the zinc oxide obtained by this process has an average thickness of 0.1 to 2 µm, an average particle size of 1 to 100 µm, and an electric resistance of $1 \times 10^3$ Ω·cm or less.

As a process for producing zinc oxide in the form of fine particles which has a different use purpose but appears to have electroconductivity, JP-A-11-279525 discloses a doped electroconductive zinc oxide powder which (a) comprises at least one element selected from IIIB group elements and IVB group elements, wherein (b) the arithmetic average particle size in a given direction is from 3 to 100 nm in an electron microscopic projection image thereof, and (c) the total content of the IIIB group element(s) and the IVB group element(s) is from 1 to 15% by mole.

However, the inventors' investigation demonstrates that in the case of dispersing the zinc oxide powder produced by a conventional process as described above into a base material such as rubber or resin, the property of the base material can be maintained but a fall in the electric resistance value is insufficient or both of the base material property and the electric resistance value are insufficient in any case. Thus, it cannot be said that the purpose of the addition of the electroconductive zinc oxide powder can be sufficiently exhibited.

Paying attention to such a situation, the inventors have made the present invention. An object thereof is to provide an electroconductive zinc oxide powder having excellent dispersibility and electroconductivity-imparting property such that the incorporation of the powder into a base material such as rubber or resin causes a composition having a largely-decreased electric resistance value to be yielded without lowering the property of the base material; a process for the production thereof; and further an electroconductive composition wherein characteristics of the electroconductive zinc oxide powder are utilized to reform rubber or resin.

DISCLOSURE OF THE INVENTION

The electroconductive zinc oxide powder of the present invention which has solved the above-mentioned problems is characterized in that: at least one element selected from the group consisting of IIIB group elements, IVB group elements and Fe is solid-solved in zinc oxide at 0.01 to 10% by mass of the zinc oxide; the average primary particle size calculated from the specific surface area of the powder is 0.03 µm or less; the bulk density is 0.20 g/mL or less; and the volume resistivity is $10^{10}$ Ω·cm or less.

The production process of the present invention is placed as a production process useful for the electroconductive zinc oxide powder having the above-mentioned characteristics, and the constituent thereof is summarized as follows:

A process wherein the following steps are successively carried out:

(I) the step of reacting an alkali carbonate with an aqueous slurry of zinc oxide to yield basic zinc carbonate, (II) the step of heating and aging the basic zinc carbonate, (III) the step of mixing the resultant aged solution with a water-soluble salt of at least one element selected from the group consisting of IIIB group elements, IVB group elements, and Fe, (IV) the step of dehydrating and drying the aged matter, (V) the step of firing the resultant dry matter, and (VI) the step of pulverizing the dehydrated/fired matter.

When this production process is carried out, it is preferred to adopt a method of setting the aqueous slurry concentration of zinc oxide used in the step (I) to 10% or less by mass and further firing the above-mentioned dry matter at 300 to 600° C. in an oxidizing atmosphere or reducing atmosphere in the step (V) since the method makes it possible to yield more surely an electroconductive zinc oxide powder satisfying the above-mentioned characteristics specified in the present invention, that is, characteristics such that the average primary particle size is 0.03 µm or less, the bulk density is 0.20 g/mL or less and the volume resistivity is $10^{10}$ Ω·cm or less.

The electroconductive zinc oxide powder according to the present invention is incorporated into various base materials such as rubber and resin, whereby excellent electroconductivity is given thereto. A matter wherein rubber or resin, out of various material, is selected as the base material and 10 to 300 parts by mass of the electroconductive zinc oxide powder are evenly dispersed into 100 parts by mass of the base material, is recommendable as a preferred use embodiment of the present invention since the matter exhibits an excellent electroconductivity such that the volume resistivity is from $10^3$ to $10^{11}$ Ω·cm.

BEST MODES FOR CARRYING OUT THE INVENTION

The inventors have proceeded with research from various viewpoints in order to make clear reasons for problems encountered in the prior art as described above, in particular, for the reason why a fall in the electric resistance value obtained when the electroconductive zinc oxide powder produced by conventional processes are dispersed into a base material such as rubber or resin is insufficient and the effect of the addition of the electroconductive zinc oxide powder is not sufficiently exhibited.

The inventors have considered that: even if the numerical particle size calculated from the specific surface area of electroconductive zinc oxide powder and a microscopic projection image thereof is made sufficiently small, almost all of primary particles of the electroconductive zinc oxide secondarily aggregate because of the fineness of the primary particles; and under practical use conditions thereof, the zinc oxide is not finely dispersed into a size of about 0.1 µm or less, thereby causing serious difficulties in the impartation of electroconductivity to a base material such as rubber or resin.

In other words, it appears that: the electroconductive zinc oxide fine powder produced by conventional processes as described above has a small apparent primary particle size, as is seen about the BET diameter calculated from the specific surface area, the average particle size obtained from an electron microscopic projection image thereof, or some other diameter; however, when the powder is dispersed in a base material such as rubber or resin, the powder is not dispersed in the form of fine particles as expected since primary particles thereof secondarily aggregate strongly.

Figure 2:
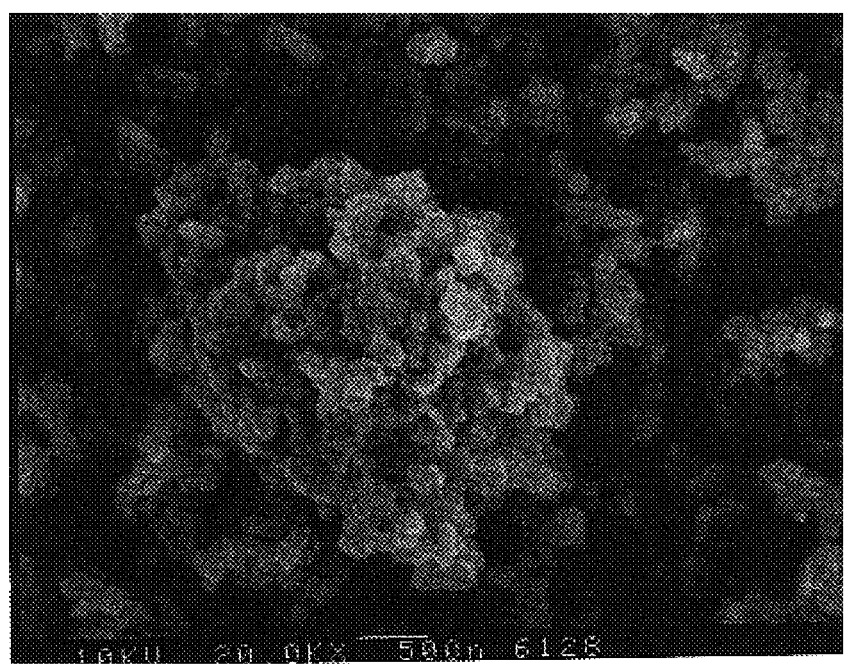
FIG. 2 is an electron microscopic photograph, in place of any drawing, illustrating a conventional electroconductive zinc oxide powder obtained in a comparative example.

Thus, the inventors have examined what kind of aggregation form electroconductive zinc oxide powder has in order to make clear the reason why the property of the powder is not effectively exhibited at the time of incorporating the powder into rubber, resin or the like even if the primary particle size thereof is sufficiently small. As a result, it has been proved that in any conventional electroconductive zinc oxide powder, all of primary particles thereof contact each other on relatively large areas or contact each other at plural points to aggregate, as is seen in FIG. 2 (a microscopic photograph, in place of any drawing, illustrating a conventional electroconductive zinc oxide powder), about which a description will be given later, that is, the primary particles adhere to each other in a face-contact form so as to be densely gathered and integrated with each other.

As described above, in the case that the powder is present as secondary aggregates, wherein primary particles are densely gathered and integrated with each other, almost all of the powder can be dispersed as the secondary aggregates at the time of incorporating the powder into a base material even if the primary particles are made fine. Thus, it is difficult that the powder is turned into the state that the primary particles are evenly dispersed. Accordingly, the inventors have considered that if the powder can be made not into aggregates wherein primary particles in a superfine particle form are gathered and integrated with each other by strong aggregating force but into secondary aggregates wherein primary particles are in a point contact state that they are loosely aggregated, the secondary aggregates are easily dissociated at the time of incorporating the powder into a base material such as rubber or resin so that the powder may be finely and evenly dispersed, as primary particles in a superfine particle form, into the base material. Along this, the inventors have proceeded with research.

As a result, the inventors have found out that when conditions for producing such electroconductive zinc oxide powder are contrived as will be detailed later, there can be obtained a new electroconductive zinc oxide powder which is bulky and extremely small in bulk density with fine primary particles being in a loose point-contact state, which has an excellent dispersibility specific to rubber, resin and the like, and give a composition having a very small volume resistivity. As a result, the present invention has been derived.

Accordingly, the present invention is an invention which is practically useful as a production process, as will be detailed later, and an electroconductive zinc oxide powder produced by this process is a new, very industrially-useful material since the material has peculiar properties that any conventional electroconductive zinc oxide powder does not have, in particular, properties that the bulk density is very small, the dispersibility is good and properties of lowering the volume resistivity of a base material such as rubber or resin remarkably.

The electroconductive zinc oxide powder of the present invention will be described mainly on the basis of its peculiar properties, and further a production process thereof will be detailed hereinafter.

The electroconductive zinc oxide powder of the present invention is a powder in a superfine particle form which has an average primary particle size of 0.03 µm or less, the particle size being calculated from its specific surface area. Herein, the average primary particle size calculated from the specific surface area is a value calculated by measuring the specific surface area in a usual way in accordance with the BET method, and then substituting the resultant value into the following equation (1):

$$d = 1.06/S \qquad (1)$$

wherein d is the average primary particle size (unit: µm) and S is the specific surface area (unit: m²/g) obtained by the BET method.

In the electroconductive zinc oxide powder of the present invention, zinc oxide crystal contains therein at least one element selected from the group consisting of IIIB group elements, IVB group elements and Fe in a solid solution state. The zinc atom in zinc oxide is present as a bivalent cation, but when the above-mentioned element selected is solid-solved in zinc oxide, the selected element is turned to a trivalent cation. Therefore the selected element then releases one more electron than zinc. The electron is a direct cause for imparting electroconductivity to zinc oxide.

Examples of the IIIB group elements added for imparting electroconductivity include aluminum, gallium, and indium, and examples of the IVB group elements include germanium and tin. In the present invention, a desired element is selected from the group consisting of these elements plus Fe. These elements may be used alone, or any appropriate combination of two or more thereof may be used if necessary.

Of the above-mentioned elements, the IIIB group and IVB group elements are elements well-known as doping elements for imparting electroconductivity to zinc oxide. The inventors have made it definite that Fe also can be effectively used as an electroconductivity-imparting element in the same manner as these doping elements. In other words, it has been made definite that Fe, in particular, trivalent Fe keeps the trivalent state to act effectively as a dopant element even when it is fired in a reducing atmosphere in order to yield an electroconductive zinc oxide powder having a low volume resistivity. When an appropriate amount thereof is solid-solved in zinc oxide, electroconductivity can be given thereto.

It is desired to incorporate the above-mentioned element at a content by percentage ranging from 0.01 to 10% by mass of zinc oxide, the content being calculated in terms of the metal therein. For reference, if the content is less than 0.01% by mass, satisfactory electroconductivity cannot be imparted to the zinc oxide powder because of insufficient doping. Accordingly, even if the resultant electroconductive zinc oxide powder is incorporated into a base material such as rubber, an intended low resistivity is not easily obtained. If the content is made excessively large over 10% by mass, the volume resistivity of the electroconductive zinc oxide powder becomes low but the primary particle size thereof tends to become large. Accordingly, the electroconductivity-imparting effect obtained when the powder is evenly dispersed into a base material such as rubber tends to fall and additionally a harmful effect may be produced on original properties of the base material. From such a viewpoint, the content by percentage of the above-mentioned added element is more preferably 0.05% or more and 5% or less by mass, even more preferably 0.1% or more and 3% or less by mass, the content being calculated in terms of the metal therein.

The electroconductive zinc oxide powder of the present invention is a powder wherein an appropriate amount of the specified element(s) is incorporated into zinc oxide, as described above, thereby dissolving the element(s) in a solid state into crystal of zinc oxide so as to reduce the volume resistivity into $10^{10}$ Ω·cm or less, and the volume resistivity is more preferably $10^8$ Ω·cm or less, even more preferably $10^6$ Ω·cm or less. The powder where the volume resistivity is more than $10^{10}$ Ω·cm is excluded as a power wherein the electroconductivity-imparting effect cannot be kept in a level intended in the present invention.

The volume resistivity herein is a value obtained by putting 10 g of a sample powder into a cylinder which has an inside diameter of 25 mm and is processed with polytetrafluoroethylene resin, compressing the powder at 10 MPa, and measuring the volume resistivity of the compressed powder with a volume resistivity measuring device "CDM-2000 model tester" manufactured by Custom Co., Ltd.

Furthermore, the greatest characteristic of the electroconductive zinc oxide powder according to the present invention is that the bulk density thereof is far smaller than that of any conventional electroconductive zinc oxide powder, and is a value of 0.20 g/mL or less. This bulk density is a value measured by the method prescribed in JIS K 5101. The matter that this value is a very small value of 0.20 g/mL or less means that the space occupation ratio of zinc oxide is an extremely small value of only 3.6% (=0.20 (g/mL)/5.6 (g/mL)×100) or less, in the case of taking the true density (5.6) of zinc oxide into consideration. In other words, this matter means that about the zinc oxide powder of the invention, fine particles thereof occupy space very thinly as viewed at a microscopic level. So to speak, primary particles thereof gather in a state that they adhere very loosely to each other in space.

In order for the fine primary particles to turn into the state that they adhere very loosely to each other so as to gather in this way, it is indispensable that the primary particles gather in a state that they point-contact each other. As a result, a product powder therefrom, which may be a secondary aggregate, is a very bulky aggregate of the primary particles which are in a state that they can be very easily dispersed. Such an aggregate state can be seen in, for example, a microscopic photograph also which will be presented in place of FIG. 1 in Examples, which will be described later. The bulk density is more preferably 0.17 g/mL or less in order to cause the characteristic of the invention to be exhibited more effectively.

The zinc oxide powder of the present invention is a powder wherein primary particles gather in a state that they point-contact each other very loosely as described above, thereby exhibiting a small bulk density. When the powder is incorporated into rubber, resin or the like, it appears that fine secondary particles, as well as coarse particles therein, disintegrate in the base material so that almost all of the particles are finely dispersed in a primary particle form. As a result, the zinc oxide powder exhibits distinguished dispersibility. As a method for evaluating the dispersibility, for example, a method as follows is adopted:

1) 4.7 g of an electroconductive zinc oxide powder, which is a sample, and 4 g of xylene are precisely weighed. These are added to 80 g of an epoxy resin (trade name "1001×75", manufactured by Japan Epoxy Resins Co., Ltd.). A homogenizer (trade name "Ace homogenizer AM-7 model", manufactured by Nippon Seiki Co. Ltd.) is used to disperse the powder at 10,000 rpm for 10 minutes, thereby yielding a dispersion of the electroconductive zinc oxide powder.

2) To the dispersion yielded in the item 1) is added 48 g of an epoxy resin hardener (trade name "S002", manufactured by Japan Epoxy Resins Co., Ltd.), and then the components are stirred with a propeller type stirrer for one minute to be mixed.

3) The dispersion yielded in the above is applied onto a PET film having a thickness of 100 μm using an applicator wherein a thickness setting is set into 250 μm.

4) After the application, the resultant is dried for one day, and then the thickness of the coat is measured with a micrometer. A region in the coat having an even and constant thickness (about 150 μm) is cut off, and then the test piece is stuck onto a region on an integrating sphere to which incident light is radiated inside a spectrophotometer (trade name "UV-260, manufactured by Shimadzu Corp."), and then the transmittance thereof is measured.

In connection with transmittances measured as described above, it can be judged that as a sample has a higher visual ray transmittance and a lower ultraviolet ray transmittance, the sample is a sample wherein zinc oxide particles are more finely dispersed. For reference, the visual ray transmittance of the electroconductive zinc oxide powders according to the present invention is about 10% or more and the ultraviolet ray transmittance thereof is less than 0.1% while the visual ray transmittance of any conventional electroconductive zinc oxide powder is less than 10% and the ultraviolet ray transmittance thereof is over 2%, as is made evident in Examples and Comparative Examples, which will be described later. It can be understood from this matter that the electroconductive zinc oxide powder of the present invention has remarkably good dispersibility.

In the present invention, it is recommendable to use, for example, a method described below as a method for obtaining an electroconductive zinc oxide powder which is bulky and excellent in dispersibility, as described above.

A process wherein the following steps are successively carried out:

(I) the step of reacting an alkali carbonate with an aqueous slurry of zinc oxide to yield basic zinc carbonate, (II) the step of heating and aging the basic zinc carbonate, (III) the step of mixing the resultant aged solution with a water-soluble salt of at least one element selected from the group consisting of IIIB group elements, IVB group elements, and Fe, (IV) the step of dehydrating and drying the aged matter, (V) the step of firing the resultant dry matter, and (VI) the step of pulverizing the fired matter.

Specifically, to an aqueous slurry containing zinc oxide, which is a starting material, is added an alkali carbonate (or a compound which will decompose to generate carbon dioxide gas and an alkali) (hereinafter referred to as the alkali carbonate in behalf thereof so as to produce basic zinc carbonate (hereinafter this step will be referred to as the basic zinc carbonate producing step as the case may be).

The zinc oxide used as the starting material may be any material if the material is the so-called zinc oxide, and may be, for example, zinc oxide produced by any one of a) French process of melting/vaporizing zinc and oxidizing zinc in a gas phase, b) American process of calcining zinc ore so as to be reduced, and then oxidizing the reduced zinc ore, c) a wet process (thermal decomposition process) of adding sodium ash into a solution of a zinc salt to precipitate basic zinc carbonate, and then drying and firing the precipitation, and other processes. It is however desired to use zinc oxide the purity of which is as high as possible in order to yield an electroconductive zinc oxide powder having a high purity.

No especial limit is imposed upon water used when above zinc oxide as the starting material is suspended to be turned into an aqueous slurry. In accordance with the purity desired for the zinc oxide powder that is a product, tap water from which impurity components are removed, ion exchange water or distilled water may be appropriately selected and used.

In the above-mentioned basic zinc carbonate producing step, a particularly noteworthy matter is to make the slurry of zinc oxide as the starting material into a low concentration, preferably a concentration of 0.1% or more by mass and 10% or less by mass, more preferably 0.5% or more by mass and 8% or less by mass, most preferably 1% or more by mass and 5% or less by mass.

For reference, if the slurry concentration is more than 10% by mass, basic zinc carbonate having a large particle size is produced or aggregates wherein primary particles aggregate intensely in a face-contact state are easily produced. Consequently, an electroconductive zinc oxide powder obtained by subsequent doping treatment does not easily satisfy physical properties intended in the invention, either. On the other hand, if the slurry concentration is too thin, the amount of water to be removed in a drying step and other steps becomes excessive so as to lower the productivity or energy efficiency. Thus, this case is unpractical.

The kind of the alkali carbonate is not particularly limited. Ordinary examples thereof include sodium carbonate, sodium hydrogen carbonate, ammonium carbonate, and ammonium hydrogen carbonate. These may be used alone. If necessary, two or more thereof may be appropriately combined and used. Urea reacts with ammonium nitrate or the like, thereby producing carbon dioxide gas and an alkali. Thus, these also may be used as a material having the same effect as the alkali carbonate.

If the water temperature when the alkali carbonate is dissolved is high, the salt decomposes thermally before the salt is reacted with the zinc oxide slurry, so as to generate carbon dioxide gas. Thus, the water temperature is restrained preferably into 30° C. or lower, more preferably into 20° C. or lower. The concentration of the alkali carbonate is not particularly limited, and it is advisable to completely dissolve the alkali carbonate in an amount sufficient for the production of basic zinc carbonate, which will be described below, in an appropriate amount of water, preferably in an amount of water more than sufficient to saturate, and then use this solution.

The device used in the step of producing basic zinc carbonate is not particularly limited, either. Preferred is, for example, a reaction device of a stirring tank type which has a stirring means, a heating means, a cooling means and the like, and has a function of causing the zinc oxide particles to be certainly floated without being precipitated, so as to maintain the slurry state thereof, and further proceeding the reaction of the zinc oxide particles with the alkali carbonate effectively by the introduction of the alkali carbonate into this device.

The production of the basic zinc carbonate can be actually performed by various methods. The manner of the reaction is not particularly limited, either. Examples of the manner which is preferably adopted include a semicontinuous manner (a semibatch manner) of charging the zinc oxide slurry firstly into a reaction tank and then supplying, thereto, the alkali carbonate solution continuously to produce a basic zinc carbonate slurry; and a continuous manner of supplying both of the zinc oxide slurry and the alkali carbonate solution continuously into a reaction tank to produce a basic zinc carbonate slurry, and then continuously bringing the produced basic zinc carbonate slurry out from the reaction tank.

In the case of the continuous manner, a single reaction tank may be used but it is preferred to use reaction equipment in which two or more tanks are connected in series since the yield of the basic zinc carbonate can be made high. Of course, it is industrially effective to produce the basic zinc carbonate continuously by use of an in-line mixer or the like which is designed so as to ensure retention time sufficient for proceeding of the reaction.

In the present invention, it appears that the reaction for producing the basic zinc carbonate by reacting the zinc oxide particles with the alkali carbonate (hereinafter referred to as the basic zinc carbonate producing reaction as the case may be) proceeds as follows: a small amount (for example, about 0.5% by mass at 18° C.) of zinc oxide, which itself is poorly-soluble in water, is dissolved, in a saturated state, in boundary films near particle surfaces thereof, and the alkali carbonate, which has a high solubility in water, is dissolved into the boundary films so as to be diffused up to the vicinity of the particle surfaces; in the case of, for example, ammonium hydrogencarbonate, liquid-phase reaction proceeds in the boundary films of interfaces between the solid and the liquid in accordance with the following formula (2):

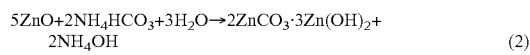

$$5ZnO + 2NH_4HCO_3 + 3H_2O \rightarrow 2ZnCO_3 \cdot 3Zn(OH)_2 + 2NH_4OH \qquad (2)$$

The produced basic zinc carbonate is a salt that is poorly-soluble in water, and it appears that the supersaturation solubility thereof is not substantially present and the salt precipitates as fine particles immediately.

The reaction temperature when the basic zinc carbonate is produced is not particularly limited, and is preferably 10° C. or higher and 80° C. or lower, more preferably 20° C. or higher and 70° C. or lower. As the temperature is higher, the reaction itself, which is represented by the formula (2), advances at a higher rate. However, as the reaction temperature becomes higher, carbon dioxide gas is generated so that the yield of the basic zinc carbonate becomes lower. Therefore, in order to make the reaction rate high while preventing carbon dioxide gas from being generated by decomposition, it is desired to conduct the reaction within the above-mentioned temperature range.

The reaction time (the average retention time in the reactor in the case of the continuous manner), which may be varied depending on the reaction temperature, the concentration of the introduced alkali carbonate and others, cannot be decided in a single way, and is usually from about 10 minutes to about 10 hours, preferably from about 30 minutes to about 5 hours. It is desired to set, into the used reaction equipment, a heating means, a temperature-keeping means, a temperature-controlling means, or the like in order to obtain an appropriate temperature.

In the present invention, to the slurry containing the basic zinc carbonate obtained in the above-mentioned basic zinc carbonate producing step is added a compound of at least one element selected from the group consisting of IIIB group elements, IVB group elements and Fe, as an additive for imparting electroconductivity, at a ratio of 0.01 to 10% by mass of zinc oxide, the ratio being calculated in terms of the metal therein. If the ratio is less than 0.01% by mass, the electroconductive zinc oxide powder which is finally obtained is insufficient in electroconductivity. Thus, if the powder is incorporated into rubber, resin or the like, a satisfactory electroconductivity-imparting effect cannot be obtained. If the ratio becomes over 10% by mass so that the added amount turns too large, the volume resistivity of the obtained electroconductive zinc oxide powder gets low but the particle size of the powder and the bulk density thereof become large. As a result, the dispersibility in rubber, resin or the like lowers so that features intended in the invention are not sufficiently exhibited.

It is preferred to use the compound of the above-mentioned element, which is added for doping, in the form of an oxide, hydroxide, or soluble salt. In the case of using an oxide or hydroxide, it is advisable to add this salt in the form of fine powder with the average particle size of preferably 1 μm or less, more preferably 0.1 μm or less in order to disperse the salt evenly into the basic zinc carbonate slurry. When the compound is added as a soluble salt, this is added in the form of a solution having any concentration. The soluble salt is preferable for the following reason: the liquid property of the slurry containing the basic zinc carbonate is alkaline; therefore, the added soluble salt contacts the slurry so that a fine hydroxide is immediately formed and then the hydroxide is more evenly incorporated into the basic zinc carbonate.

In the dehydrating step performed next, an ordinary slurry dehydrating method can be used without any limitation, examples of the method including solid-liquid separating method such as a centrifugal dehydrator, filter press, a belt filter, a Nutsche filter, screw press, belt press, and a spray drier.

The firing after the drying may be performed in either one of an oxidizing atmosphere and a non-oxidizing atmosphere. In the case of making the volume resistivity of electroconductive zinc oxide lower, the firing is preferably performed in a reducing atmosphere. The furnace used in the firing may be any firing furnace capable of heating the dry matter up to a necessary temperature, setting the temperature for the firing and the like at will, and further controlling them with a sufficient precision. The firing may be performed in either one of an oxidizing atmosphere and a non-oxidizing atmosphere, and is performed preferably at 300° C. or higher (more preferably at 350° C. or higher) and at 600° C. or lower (more preferably at 500° C. or lower, even more preferably at 450° C. or lower). If the firing temperature is too high, zinc oxide, which is produced by the decomposition of the basic zinc carbonate, undergo grain growth in the step of the firing so that the primary particle size grows into 0.03 μm or more and further aggregates of secondary particles or higher ones become dense so that the bulk density exceeds 0.20 g/mL. Thus, when such powder is added to rubber, resin or the like, the dispersibility thereof becomes poor. If the firing temperature is a low temperature which is less than 300° C., fine zinc oxide can be obtained by thermal decomposition of the basic zinc carbonate but the above-mentioned electroconductivity-imparting element is not easily solid-solved in zinc oxide. Thus, the volume resistivity of the electroconductive zinc oxide powder exceeds $10^{10}$ Ω·cm.

The electroconductive zinc oxide obtained by the firing at a relatively low temperature as described above is subsequently pulverized by any method, and optionally the particle size thereof is adjusted, thereby preparing an electroconductive zinc oxide powder having a desired bulk density.

The thus obtained electroconductive zinc oxide powder of the present invention is a powder wherein primary particles themselves are fine, as detailed above, and further secondary aggregates thereof are aggregates having an extremely small bulk density in which the primary particles are loosely gathered in the state of a point-contact between each other, and the secondary aggregates have far better dispersibility than conventional secondary aggregates. Thus, the powder can finely be dispersed into various base materials, such as rubber or resin, with ease. As a result, the frequency of the contact between the electroconductive zinc oxide fine particles in the base material becomes high so as to exhibit an excellent effect of imparting electroconductivity to the base material, that is, an effect of decreasing the volume resistivity.

Accordingly, when such properties are well utilized to incorporate the powder into various rubbers, resins, fiber materials, paints or the like as illustrated below, the powder can be used broadly and effectively as an electroconductive or antistatic material.

[Electroconductive or Antistatic Rubber Material]

Various electroconductive rolls or belts for electrophotography, caster materials, electroconductive gloves, electroconductive work shoes, soles for clean room, pressure sensor materials, and the like.

[Electroconductive or Antistatic Resin]

Tile materials or various antifouling panel materials for floor faces or wall faces in factories, housing, and buildings for common use; various window materials; transparent electroconductive plates or membrane materials; packaging materials, containers or cases for electronic parts such as IC and LCI; various materials for molded products, such as semiconductor cases, trays, and jigs; various instruments and household furniture for resisting static electricity; various materials for meter windows, such as a CRT window; image-recording materials; electrode-forming materials; electric charge controlling materials; static-electricity-applying materials; toner materials for electrophotography; color toner materials; toner carrier materials; electromagnetic wave shielded panel materials; electroconductive pipe materials; pressure sensor materials; and the like.

[Electroconductive or Antistatic Paint, Coating Material, and Primer]

Electroconductive coating materials, primers for electrostatic coating, electroconductive paints, transparent paints, and the like.

[Electroconductive or Antistatic Film and Sheet]

Electrostatic/dustproof film materials such as wrapping films and antistatic films, electroconductive laminate paper, electroconductive laminate sheets, table sheets, antireflective films, touch panels, pressure sensor materials, condensers, thin film complex circuit materials, various materials for panels such as liquid crystal, EL, ECD, and PDP, heat ray or ultraviolet ray shielding transparent film/sheet materials, and the like.

[Electroconductive or Antistatic Fibers]

Clothes for clean room, hats or caps, gloves, work clothes, wall cloths, curtains, screens, mats, carpet materials, antistatic underclothes/clothing, dustproof brushes, clothes for surgery, various antistatic fiber product materials, and the like.

[Electroconductive or Antistatic Glass]

Electroconductive or antistatic glass materials, materials for Braun tubes, materials for solar panels, materials for dye-sensitization type electrodes, and the like.

[Electroconductive Cosmetic Materials]

Additives to heat ray blocking creams, foundation creams, face powder, pressed powder, lipsticks, rouge, eye shadows, sunscreen creams, loose powder, milky lotions, and the like.

[Others]

Electrostatic recording paper, electrostatic recording copying substrates, electric-conduction thermally sensitive recording paper, discharge breakdown recording paper, electrophotographic paper, electrophotographic copying substrates, desulfuring agents, heat-generating panels, electromagnetic shielding materials, thermally conductive rubber/resin, and the like.

When rubber or resin, which may be a paint material, out of the above-mentioned articles, is used as a base material and, for example, 10 to 300 parts by mass of the electroconductive zinc oxide powder of the present invention are incorporated into 100 parts by mass of the base material, low-resistance rubber or resin having a low volume resistivity value of 1000 to $10^{11}$ Ω·cm can be obtained.

Preferred examples of the base rubber include natural rubber (NR), isoprene rubber (IR), butadiene rubber (BR), 1,2-polybutadiene rubber (1,2-BR), chloroprene rubber (CR), styrene-butadiene rubber (SBR), butyl rubber (IIR), nitrile rubber (acrylonitrile-butadiene rubber) (NBR), hydrogenated nitrile rubber (HNBR), ethylene-propylene rubbers (EPM, EPR, EPDM, and EPT), acrylic rubbers (ACM and ANM), epichlorohydrin rubbers (CO and ECO), ethylene-vinyl acetate rubber (EVA), silicone rubber (Q), methylsilicone rubber (MQ), vinyl-methylsilicone rubber (VMQ), phenyl-methylsilicone rubber (PMQ), polysulfide rubber (T), urethane rubber (U), polyether urethane rubber (EU), polyester urethane rubber (AU), and fluororubber (FKM). These may be used alone. If necessary, two or more thereof may be appropriately combined and the combination may be used as a blend rubber.

The amount of the electroconductive zinc oxide powder incorporated into the rubber is preferably from 10 to 300 parts by mass for 100 parts by mass of the base rubber. If the amount is less than 10 parts by mass, electroconductive paths are not sufficiently connected so that the volume resistivity of the reformed rubber exceeds a level of $10^{11}$ Ω·cm. Even if the powder is incorporated in an excessive amount over 300 parts by mass, vain costs are generated since the volume resistivity of the reformed rubber is saturated at a level of $10^3$ Ω·cm and is not turned into a value lower than it.

Especial limitation is not imposed on the additive which can be incorporated together with the electroconductive zinc oxide powder into the base rubber, and rubber additives that are ordinarily used can be used in the same manner. Non-restricted examples of the additives which can be incorporated into the base rubber include a vulcanizing agent (curing agent), a vulcanization promoter, a vulcanization promotion aid, an age resistor (antioxidant), fillers (a reinforcing agent and a bulking agent), a coloring agent, a lubricant, an ultraviolet absorber, a light stabilizer, an antibacterial agent, and a flame retardant.

Examples of the vulcanizing agent include sulfur, inorganic sulfur compounds, organic sulfur compounds, organic peroxides, and metal oxides known in the prior art. It is particularly preferred to use sulfur or a sulfur compound since the volume resistivity can be more effectively decreased. A preferred amount of the incorporated sulfur or sulfur compound is from about 0.1 to 5% by mass for 100 parts by mass of the base rubber.

In order to knead the base rubber, the electroconductive zinc oxide powder and further other additives, it is advisable to use a Banbury mixer, a kneader, an intermix, a roll kneader, or the like in a usual way. If necessary, another organic or inorganic electroconductive material may be incorporated.

For the molding processing for a rubber product, it is advisable to process the kneaded matter into which the electroconductive zinc oxide powder is incorporated into any shape such as a sheet, belt or roll in a usual way. In the case of processing the powder into the form of a sheet (particularly, a thin sheet), calendaring or rolled sheet processing is preferred. In the case of processing the powder into the form of a flat plate, sheet, tube (monolayered or multilayered) or rod (roll), or into a complicated deformed cross-sectional shape, extrusion molding, injection molding, press molding or the like is adopted. Usually, after molding processing as described above is performed or in the final step of the molding processing, vulcanization is performed. In the vulcanization, the molded matter obtained by calendaring, extrusion processing or the like as described above is heated and crosslinked in the presence of a vulcanizing agent such as sulfur, thereby yielding an elastic rubber product.

The vulcanizing device may be any device capable of receiving a blend rubber molded matter as described above and heating the matter. A vulcanizer is typical one out of vulcanizing devices. It is advisable to set the blend rubber molded matter into this, and heat the matter by any means such as vapor heating, hot wind heating, infrared ray heating, electrical heating, or microwave heating. It is allowable to use a heating press machine to heat the molded matter while pressuring the matter. In the case that the molded matter is in a sheet or belt form, it is recommendable as a preferred method to heat and vulcanize the sheet or belt while transferring it continuously.

The vulcanization temperature is varied dependently on the kinds of the base rubber, the vulcanizing agent, the vulcanization promoter and the like. Usually, the vulcanization is performed at about 120 to 200° C. About the vulcanization time, a change in the tensile stress or torque of a test piece of the rubber molded matter, which is a subject, is continuously measured under a given temperature condition in a preliminary experiment, and then a graph thereof is made. On the basis of the results, the time is set in each case. The vulcanization time is generally from about 2 to 60 minutes, more generally from about 5 to 60 minutes.

The volume resistivity of the resultant electroconductive rubber molded matter is prescribed in JIS K 6911 also, and can be measured in accordance with this method, using, for example, trade name "HIRESTA-IP (100 V)" manufactured by Mitsubishi Oil Co., Ltd., or the like.

The kind of the base resin is not particularly limited, either. For example, all of the following can be used: epoxy resin, acrylic resin, polyamide resin, polyurethane resin, polyester resin, polyolefin resin, phenolic resin, urea resin, melamine resin, and silicone resin.

A preferred amount of the electroconductive zinc oxide powder incorporated into the base resin cannot be decided in a single way since the amount is varied dependently on the kind of the base resin, and the degree of the electroconductivity required for a target electroconductive resin. The amount is usually from 10 to 300 parts by mass, more generally from 20 to 150 parts by mass for 100 parts by mass of the base resin. For reference, if the amount of the incorporated electroconductive zinc oxide powder is too small, electric conduction paths are not sufficiently connected so as to give insufficient electroconductivity, whereby the volume resistivity of the electroconductive composition exceeds a level of $10^{11}$ Ω·cm. If the incorporated amount is too large, vain costs are generated since the volume resistivity of the reformed resin is saturated at a level of $10^3$ Ω·cm and is not turned into a value lower than it.

Especial limitation is not imposed on the additives which can be incorporated, together with the electroconductive zinc oxide powder, into the base resin. Resin additives which are ordinarily used can be used in the same manner. Non-restricted examples of the additives which can be incorporated into the base resin include a plasticizer, an age resistor (antioxidant), fillers (a reinforcing agent and a bulking agent), a coloring agent, a lubricant, an ultraviolet absorbent, a light stabilizer, an antibacterial agent, and a flame retardant.

In order to knead the base resin, the electroconductive zinc oxide powder and further other additives, it is advisable to use a Banbury mixer, a kneader, an intermix, or the like in a usual way. If necessary, another organic or inorganic electroconductive material may be incorporated.

For the molding processing for a resin product, it is advisable to adopt injection molding, extrusion molding, press molding, blow molding or the like to mold the kneaded matter into which the electroconductive zinc oxide powder is incorporated into any shape in a usual way.

In the case of using the electroconductive zinc oxide powder of the present invention for electroconductive or antistatic paint, it is advisable to incorporate, into the base resin constituting the paint, the electroconductive zinc oxide powder preferably at a ratio of 10 to 50% by mass, more generally at a ratio of 15 to 40% by mass of the total of the dry paint film, so as to disperse the powder evenly into the vehicle components. The form of the paint is not limited at all. The present invention is applied to all paints, for example, organic solvent paint, water paint, slurry paint, and powder paint. Any resin for the paint can be used regardless of the type thereof, for example, a heat curing type or a dry curing type. The kind of the base resin constituting the paint is not limited at all. For example, all of the following can be used: epoxy resin, acrylic resin, polyamide resin, polyurethane resin, polyester resin, polyolefin resin, alkyd resin, and the like.

Non-restricted examples of the additives which can be incorporated into the resin for paint include a plasticizer, an age resistor, a coloring agent, an extender, a fluidity adjuster, a lubricant, an ultraviolet absorbent, a light stabilizer, an antibacterial agent, and a flame retardant.

EXAMPLES

The present invention will be described more specifically by way of the following working examples and comparative examples. Of course, however, the invention is not limited by the working examples, and can be carried out while being appropriately modified within a scope conformable to the subject matter which has been described above and will be described below. Any one of the modifications is included in the technical scope of the invention.

Example 1

To 2800 ml of distilled water of 20° C. temperature was added 150 g of a zinc oxide powder, 0.1 μm in average particle size, produced by French process, so as to disperse the powder. Separately, 75 g of ammonium hydrogen bicarbonate was dissolved in 500 mL of water of 20° C. temperature. This solution of ammonium hydrogen bicarbonate in water was added to the above-mentioned zinc oxide dispersion, and then resultant dispersion was stirred at the same temperature for 30 minutes. Thereafter, the temperature of the dispersion was raised to 70° C. at a rate of 1° C./minute, so as to produce basic zinc carbonate. The resultant was aged at the same temperature for 30 minutes, thereby growing crystal of the basic zinc carbonate.

Next, 14.3 g of aluminum sulfate was dissolved into 500 mL of distilled water, and then this solution was added to the aqueous dispersion of the basic zinc carbonate obtained as described above. The dispersion was stirred for 30 minutes to disperse the dispersoid. Thereafter, the temperature of the dispersion was again raised up to 70° C. Subsequently, the resultant was again aged for 30 minutes.

After the aging, the dispersion was subjected to suction filtration to collect a solid matter. The matter was dried at not higher than 150° C., and then pre-fired at 300° C. for 3 hours. The pre-fired matter was further reduction-fired at 400° C. in a hydrogen atmosphere for 2 hours. The resultant fired matter was pulverized with a pulperizer, so as to yield an electroconductive zinc oxide powder having an average particle size of 3.0 μm.

The average primary particle size of the resultant electroconductive zinc oxide powder was 0.02 μm as calculated from the specific surface area obtained by the BET method. The volume resistivity was 3000 Ω·cm, and the bulk density was 0.14 g/mL.

Figure 1:
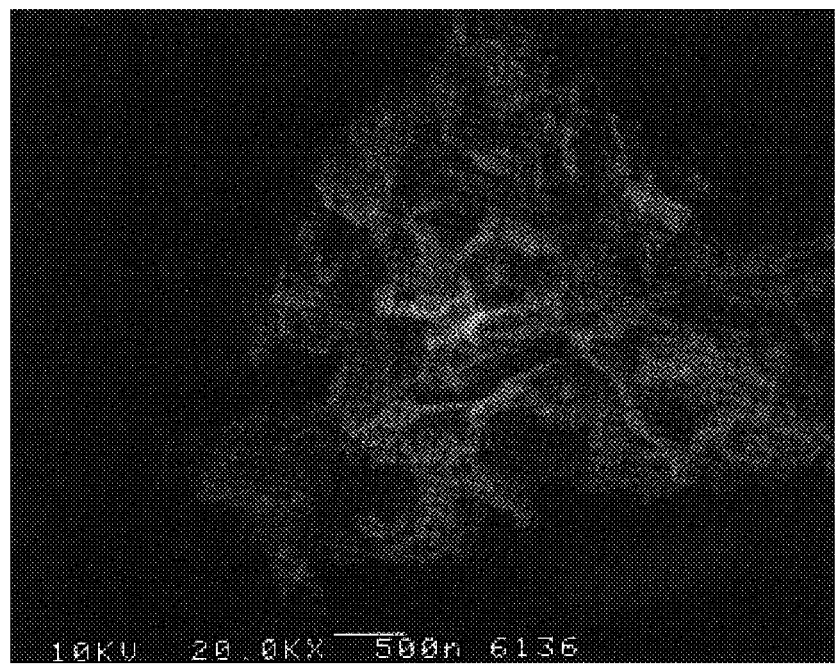
FIG. 1 is an electron microscopic photograph, in place of any drawing, illustrating an electroconductive zinc oxide powder obtained in a working example.

FIG. 1 is an electron microscopic photograph (obtained by use of trade name "JSM-5200", manufactured by JEOL Ltd.; power: 20000 magnifications) of the resultant electroconductive zinc oxide powder in place of any drawing. It can be clearly observed from its external appearance also that the powder was in a state that primary particles were loosely and very thinly gathered and united with each other as compared with an electroconductive zinc oxide powder obtained in Comparative Example 1, which will be described later.

Example 2

To 2800 mL of distilled water of 20° C. temperature was added 150 g of the same zinc oxide as used in Example 1, and then the zinc oxide was dispersed therein. Separately, 75 g of ammonium hydrogen bicarbonate was dissolved in 500 mL of water of 20° C. temperature. This solution of ammonium hydrogen bicarbonate in water was added to the above-mentioned zinc oxide dispersion, and then the resultant dispersion was stirred at the same temperature for 30 minutes. Thereafter, the temperature of the dispersion was raised to 70° C. at a rate of 1° C./minute, so as to produce basic zinc carbonate. The resultant was aged at the same temperature for 30 minutes, thereby growing crystal of the basic zinc carbonate.

Next, 1.9 g of gallium chloride was dissolved into 500 mL of distilled water, and then this solution was added to the aqueous dispersion of the basic zinc carbonate obtained as described above. The dispersion was stirred for 30 minutes to disperse the dispersoid. Thereafter, the temperature of the dispersion was again raised up to 70° C. Subsequently, the resultant was again aged for 30 minutes.

After the aging, the dispersion was filtrated and dried in the same way as in Example 1. The dry matter was then pre-fired at 300° C. for 3 hours. Subsequently, the pre-fired matter was reduction-fired at 400° C. in a hydrogen atmosphere for 2 hours. The resultant fired matter was pulverized with a pulperizer, so as to yield an electroconductive zinc oxide powder having an average particle size of 2.0 μm.

The average primary particle size of the resultant electroconductive zinc oxide powder was 0.02 μm as calculated from the specific surface area. The volume resistivity was 1000 Ω·cm, and the bulk density was 0.15 g/mL.

Example 3

To 2800 mL of distilled water of 20° C. temperature was added 150 g of the same zinc oxide as used in Example 1, and then the zinc oxide was dispersed therein. Separately, 75 g of ammonium hydrogen bicarbonate was dissolved in 500 mL of distilled water of 20° C. temperature. This solution of ammonium hydrogen bicarbonate in water was added to the above-mentioned zinc oxide dispersion, and then the dispersoid was dispersed at the same temperature for 30 minutes. Thereafter, the temperature of the dispersion was raised to 70° C. at a rate of 1° C./minute, so as to produce basic zinc carbonate. The resultant was aged at the same temperature for 30 minutes, thereby growing crystal of the basic zinc carbonate.

Next, 18.43 g of iron chloride hexahydrate was dissolved into 500 mL of distilled water, and then this solution was added to the aqueous dispersion of the basic zinc carbonate obtained as described above. The dispersion was stirred for 30 minutes to disperse the dispersoid. Thereafter, the temperature of the dispersion was again raised up to 70° C. Subsequently, the resultant was again aged for 30 minutes.

After the aging, the dispersion was filtrated and dried in the same way as in Example 1. The dry matter was then pre-fired at 300° C. for 3 hours. Subsequently, the pre-fired matter was fired at 400° C. in an oxidizing atmosphere for 2 hours. The resultant fired matter was pulverized with a pulperizer, so as to yield an electroconductive zinc oxide powder having an average particle size of 3.0 μm.

The average primary particle size of the resultant electroconductive zinc oxide powder was 0.02 μm as calculated from the specific surface area. The volume resistivity was $1 \times 10^8$ Ω·cm, and the bulk density was 0.17 g/mL.

Comparative Example 1

Into 1800 mL of distilled water of 20° C. temperature was dispersed 600 g of the same zinc oxide powder as used in Example 1. Separately, 300 g of ammonium hydrogen bicarbonate was dissolved in 1500 mL of distilled water of 20° C. temperature. Thereto was added 57.2 g of aluminum sulfate, and the dispersoid was evenly dispersed. This dispersion was added to the above-mentioned dispersion of zinc oxide, and then the resultant dispersion was stirred for 30 minutes to disperse the dispersoid. Thereafter, the temperature of the dispersion was raised to 70° C. at a rate of 1° C./minute, so as to produce basic zinc carbonate containing Al. The resultant was aged at the same temperature for 30 minutes, thereby growing crystal of the basic zinc carbonate.

The resultant dispersion was filtrated and dried in the same way as described above. The dry matter was then pre-fired at 300° C. for 3 hours. Furthermore, the pre-fired matter was reduction-fired at 800° C. in a hydrogen atmosphere for 2 hours. The resultant fired matter was pulverized with a pulperizer, so as to yield an electroconductive zinc oxide powder having an average particle size of 6.0 μm.

The average primary particle size of the resultant electroconductive zinc oxide powder was 0.2 μm as calculated from the specific surface area. The volume resistivity was 150 Ω·cm, and the bulk density was 0.4 g/mL.

In conclusion, the numerical value of the volume resistivity of the electroconductive zinc oxide powder of the present example was sufficiently small, but the particle size calculated from the specific surface area was far larger than those of Examples 1 to 3 and the bulk density also was very large.

Comparative Example 2

Into 1800 mL of distilled water of 20° C. temperature was dispersed 600 g of the same zinc oxide powder as used in Example 1. Separately, 300 g of ammonium hydrogen bicarbonate was dissolved in 1500 mL of distilled water of 20° C. temperature. Thereto was added 57.2 g of aluminum sulfate, and the dispersoid was evenly dispersed. This dispersion was added to the above-mentioned dispersion of zinc oxide, and then the resultant dispersion was stirred for 30 minutes to disperse the dispersoid. Thereafter, the temperature of the dispersion was raised to 70° C. at a rate of 1° C./minute, so as to produce basic zinc carbonate containing Al. The resultant was aged at the same temperature for 30 minutes, thereby growing crystal of the basic zinc carbonate.

The resultant dispersion was filtrated and dried in the same way as described above. The dry matter was then pre-fired at 300° C. for 3 hours. Furthermore, the pre-fired matter was reduction-fired at 400° C. in a hydrogen atmosphere for 2 hours. The resultant fired matter was pulverized with a pulperizer, so as to yield an electroconductive zinc oxide powder having an average particle size of 6.0 μm.

The average primary particle size of the resultant electroconductive zinc oxide was 0.03 μm as calculated from the specific surface area. The volume resistivity was 300 Ω·cm, and the bulk density was 0.35 g/mL. In other words, the volume resistivity of this electroconductive zinc oxide powder was low and the particle size calculated from the specific surface area was small but the bulk density was large.

FIG. 2 is an electron microscopic photograph (the used electron microscope was the same as described above; power: 20000 magnifications) of the resultant electroconductive zinc oxide powder in place of any drawing. It can be clearly observed from its external appearance also that the powder was in a state that primary particles were flatly and densely gathered and united with each other as compared with the electroconductive zinc oxide powder obtained in the above-mentioned Example 1.

Comparative Example 3

An electroconductive zinc oxide powder was produced in accordance with Example 1 described about the process for producing electroconductive zinc oxide disclosed in JP-B-62-41171.

Specifically, 30 g of ammonium carbonate was dissolved into 500 mL of water. Separately, prepared was a solution wherein 5 g of aluminum sulfate was dissolved in 50 mL of water. This was incorporated into the ammonium carbonate solution. This solution was put into a dispersion wherein 100 g of the same zinc oxide powder as used in Example 1 was dispersed in 200 mL of water. The resultant dispersion was heated to 60° C. and stirred. The dispersion was continuously stirred at the same temperature for 1 hour. Thereafter, the dispersion was filtrated and washed with water to yield a dehydrated cake. This cake was dried and then fired at 800° C. in a hydrogen atmosphere for 60 minutes to yield an electroconductive zinc oxide powder.

The average primary particle size of the resultant electroconductive zinc oxide powder was 0.4 μm as calculated from the specific surface area. The volume resistivity was 30 Ω·cm, and the bulk density was 0.45 g/mL.

In other words, the volume resistivity value of the electroconductive zinc oxide powder yielded by this process was sufficiently low, but the average primary particle size calculated from the specific surface area was far larger than those of the above-mentioned Examples 1 to 3, and the bulk density was also very large.

Performance Test 1

In order to examine the dispersibility of the electroconductive zinc oxide powders obtained in the above-mentioned Examples 1 to 3 and Comparative Examples 1 to 3, the transmittances thereof were measured by the above-mentioned dispersibility evaluation testing method. Results shown in Table 1 described below were obtained. It can be understood from this Table that the electroconductive zinc oxide powders of the present invention had higher visual ray transmittances and extremely lower ultraviolet ray transmittances than the electroconductive zinc oxide powders obtained in Comparative Examples, and had very good dispersibility.

TABLE 1

|  | Transmittance (%) | |
| --- | --- | --- |
|  | 550 nm | 350 nm |
| Example 1 | 10.56 | 0.02 |
| Example 2 | 10.88 | 0.01 |
| Example 3 | 10.55 | 0.02 |
| Comparative Example 1 | 5.33 | 2.11 |
| Comparative Example 2 | 9.13 | 5.29 |
| Comparative Example 3 | 4.25 | 1.89 |

Performance Test 2

About the electroconductive zinc oxide powders obtained in the above-mentioned Examples 1 to 3 and Comparative Examples 1 to 3, the electroconductivity-imparting effect obtained by kneading each of the powders into a rubber was evaluated on the basis of the volume resistivity according to the following method:

As a base rubber, ethylene-propylene-diene rubber (EPDM) (trade name "EP-21", manufactured by JSR Corp.) was used, and 100 parts by mass of each of the electroconductive zinc oxide powders obtained in the above-mentioned Examples and Comparative Examples were incorporated into 100 parts by mass of the base rubber, and then the components were uniformly kneaded with two rolls. After the kneading, the resultant was aged for a given time, and then thereto were added 1.75 parts by mass of sulfur as a vulcanizing agent and 1.0 part by mass of a vulcanization promoter (trade name "Nocceler EP-50", manufactured by Ouchi Shinko Chemical Industry Co., Ltd.). Furthermore, these components were uniformly kneaded, and then molded into a sheet form having a thickness of 2 mm.

The resultant sheet was put into a mold, and the mold was set into a vulcanizer to carry out vulcanization at a pressure of 9.8 MPa and a temperature of 160° C. for 60 minutes, thereby yielding a hard rubber body. The volume resistivity thereof was measured with a tester "HIRESTA-IP (100 V)" manufactured by Mitsubishi Oil Co., Ltd. in accordance with JIS K 6911.

The results are as shown in Table 2. It is understood that the electroconductive zinc oxide powders of the present invention obtained in Examples were remarkably better in the volume-resistivity-decreasing effect onto rubber than the conventional electroconductive zinc oxide powders obtained in Comparative Examples.

TABLE 2

|  |  | Example 1 | Example 2 | Example 3 | Comparative Example 1 | Comparative Example 2 | Comparative Example 3 |
|---|---|---|---|---|---|---|---|
| Electroconductive zinc oxide | Particle size (μm) | 0.02 | 0.02 | 0.02 | 0.2 | 0.03 | 0.40 |
|  | Bulk density (g/ml) | 0.14 | 0.15 | 0.17 | 0.4 | 0.35 | 0.45 |
|  | Volume resistivity (Ω·cm) | 3000 | 1000 | $1 \times 10^8$ | 150 | 300 | 30 |
| EPDM amount (% by mass) |  | 100 | 100 | 100 | 100 | 100 | 100 |
| Incorporated amount (parts by mass) of electroconductive zinc oxide |  | 100 | 100 | 100 | 100 | 100 | 100 |
| Volume resistivity of rubber (Ω·cm) |  | $9 \times 10^7$ | $1 \times 10^7$ | $8 \times 10^8$ | $1 \times 10^{15}$ | $1 \times 10^{12}$ | $1 \times 10^{15}$ |

Performance Test 3

About the electroconductive zinc oxide powders obtained in the above-mentioned Examples 1 to 3 and Comparative Examples 1 to 3, the electroconductivity-imparting effect obtained by kneading each of the powders into a resin was evaluated on the basis of the following measurement of the volume resistivity thereof:

As a base resin, an epoxy resin (trade name "1001×75", manufactured by JER Corp.) was used, and 50 g of this base resin (resin solid content: 75%) was mixed with 5.5 g of xylene, 5.5 g of isobutyl alcohol and 4.06 g of each of the electroconductive zinc oxide powders obtained in the above-mentioned Examples and Comparative Examples. About the electroconductive zinc oxide powders obtained in Examples 1 to 3 and Comparative Example 2, to each of the powders was added a dispersing agent (trade name "DA-325", manufactured by Kusumoto Chemicals Ltd.) at a ratio of 9% of the powder, and then a homogenizer was used to knead the resultant at 2000 rpm for 5 minutes. After the kneading, 30 g (resin solid content: 62.5%) of an epoxy resin hardening agent (trade name "S002", manufactured by JER Corp.) was added to the kneaded matter. A propeller stirrer was used to mix these components at 1000 rpm for 1 minute. An applicator (scale: 50) was used to form the mixture into a paint film. This was dried at 25° C. for 48 hours.

The volume resistivity of the resultant paint film of 0.2 mm thickness was measured with a tester "HIRESTA-IP (100 V)" manufactured by Mitsubishi Oil Co., Ltd. in accordance with JIS K 6911.

The results are as shown in Table 3. It is understood that the electroconductive zinc oxide powder obtained in each of Examples was remarkably better in the volume-resistivity-decreasing effect onto paint than the conventional electroconductive zinc oxide powders obtained in Comparative Examples.

INDUSTRIAL APPLICABILITY

In the electroconductive zinc oxide powder of the present invention, the average particle size of primary particles therein is very minute and additionally secondary aggregates thereof are particles wherein the primary particles are loosely gathered in a point-contact state so as to exhibit a very small bulk density, as described above. Thus, the powder is very good in dispersibility in a base material such as rubber or resin. In the base material, therefore, the particles can contact each other at a high frequency. The powder has a remarkably better electroconductivity-imparting effect than conventional electroconductive zinc oxide. Thus, the volume resistivity given to various base materials can be drastically made small. For this reason, the powder can be widely and effectively used as a material for imparting electroconductivity to various materials, typical examples of which include rubber, resin and paint.

According to the production process of the present invention, it is possible to provide an electroconductive zinc oxide powder having the above-mentioned characteristics, which cannot be obtained at all by conventional processes, in particular, a low bulk density and distinguished dispersibility and electroconductivity-imparting property.

The invention claimed is:

1. An electroconductive zinc oxide powder, wherein: at least one element selected from the group consisting of IIIB group elements, IVB group elements and Fe is solid-solved in zinc oxide at 0.01 to 10% by mass of the zinc oxide; the average primary particle size calculated from the specific surface area of the powder is 0.03 μm or less; the bulk density is 0.20 g/mL or less; and the volume resistivity is $10^{10}$ Ω·cm or less.

2. A process for producing an electroconductive zinc oxide powder according to claim 1, wherein the following steps are successively carried out:

TABLE 3

|  | Example 1 | Example 2 | Example 3 | Comparative Example 1 | Comparative Example 2 | Comparative Example 3 |
|---|---|---|---|---|---|---|
| Volume resistivity of paint film (Ω·cm) | $5 \times 10^8$ | $2 \times 10^8$ | $3 \times 10^{10}$ | $1 \times 10^{15}$ | $5 \times 10^{13}$ | $1 \times 10^{15}$ |

(I) the step of reacting an alkali carbonate with an aqueous slurry of zinc oxide to yield basic zinc carbonate, (II) the step of heating and aging the basic zinc carbonate, (III) the step of mixing the resultant aged solution with a water-soluble salt of at least one element selected from the group consisting of IIIB group elements, IVB group elements, and Fe, (IV) the step of dehydrating and drying the aged matter, (V) the step of firing the resultant dry matter at 300 to 600° C., and (VI) the step of pulverizing the fired matter.

3. An electroconductive composition, wherein an electroconductive zinc oxide powder according to claim 1 is contained in a dispersion state in an amount of 10 to 300 parts by mass per 100 parts by mass of a base material, and the volume resistivity is from $10^3$ to $10^{11}$ Ω·cm.

4. The electroconductive composition according to claim 3, wherein the base material is rubber.

5. The electroconductive composition according to claim 3, wherein the base material is resin.

6. The process according to claim 2, wherein the firing temperature is 300 to 475° C.

7. The process according to claim 2, wherein the firing temperature is 300 to 400° C.

* * * * *